United States Patent
Kim et al.

(10) Patent No.: US 11,427,659 B2
(45) Date of Patent: Aug. 30, 2022

(54) METHOD OF PREPARING ACRYLONITRILE-BASED POLYMER FOR PRODUCING CARBON FIBER

(71) Applicant: LG CHEM, LTD., Seoul (KR)

(72) Inventors: Chang Hun Kim, Daejeon (KR); Hyun Min Kim, Daejeon (KR); Jeong Hun Cho, Daejeon (KR); Joon Hee Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 265 days.

(21) Appl. No.: 16/481,395

(22) PCT Filed: Sep. 18, 2018

(86) PCT No.: PCT/KR2018/011007
§ 371 (c)(1),
(2) Date: Jul. 26, 2019

(87) PCT Pub. No.: WO2019/066360
PCT Pub. Date: Apr. 4, 2019

(65) Prior Publication Data
US 2019/0375870 A1    Dec. 12, 2019

(30) Foreign Application Priority Data

Sep. 29, 2017 (KR) ......................... 10-2017-0127936
Sep. 17, 2018 (KR) ......................... 10-2018-0110670

(51) Int. Cl.
*C08F 20/44* (2006.01)
*C08F 220/46* (2006.01)
*D01F 9/22* (2006.01)
*C08F 120/44* (2006.01)
*C08F 220/48* (2006.01)
*C08F 120/42* (2006.01)
*C08F 220/44* (2006.01)
*C08F 20/42* (2006.01)
*C08F 2/06* (2006.01)
*C08F 2/04* (2006.01)

(52) U.S. Cl.
CPC .............. *C08F 20/44* (2013.01); *C08F 20/42* (2013.01); *C08F 120/42* (2013.01); *C08F 120/44* (2013.01); *C08F 220/44* (2013.01); *C08F 220/46* (2013.01); *C08F 220/48* (2013.01); *D01F 9/22* (2013.01); *C08F 2/04* (2013.01); *C08F 2/06* (2013.01); *C08F 2800/20* (2013.01); *D01F 9/225* (2013.01)

(58) Field of Classification Search
CPC .... C08F 220/44; C08F 220/48; C08F 220/42; C08F 120/42; C08F 120/44; C08F 20/42; C08F 20/44; D01F 9/22; D01F 9/225
See application file for complete search history.

(56) References Cited

U.S. PATENT DOCUMENTS

| 3,479,312 | A | * | 11/1969 | Masatoshi ................. C08F 2/16 524/783 |
| 3,860,567 | A | * | 1/1975 | Wentworth ............ C08G 59/62 525/327.3 |
| 4,902,762 | A | | 2/1990 | Imai et al. |
| 5,886,118 | A | | 3/1999 | Percec |
| 2006/0111529 | A1 | * | 5/2006 | Boevenbrink ........ C08F 257/02 526/218.1 |
| 2010/0003515 | A1 | | 1/2010 | Tanaka et al. |
| 2013/0264733 | A1 | | 10/2013 | Ichikawa et al. |

FOREIGN PATENT DOCUMENTS

| CN | 1211580 A | 3/1999 | |
| CN | 1962703 A | 5/2007 | |
| CN | 102086538 A | 6/2011 | |
| DE | 1645491 A1 | 3/1970 | |
| EP | 0180975 A1 | 5/1986 | |
| GB | 917369 A * | 2/1963 | ............ C08F 220/44 |
| GB | 1120645 A | 7/1968 | |
| JP | H11172217 A | 6/1999 | |
| JP | 2007197672 A | 8/2007 | |
| JP | 2008214562 A | 9/2008 | |
| JP | 2010235794 A | 10/2010 | |
| JP | 2011213772 A | 10/2011 | |
| JP | 2012025810 A | 2/2012 | |
| JP | 2012025837 A | 2/2012 | |
| JP | 2012201727 A | 10/2012 | |
| KR | 100193022 B | 6/1999 | |
| KR | 1020090068370 A | 6/2009 | |
| KR | 101037115 B | 5/2011 | |
| KR | 10-20110079369 A | 7/2011 | |
| KR | 10-20130069886 A | 6/2013 | |
| KR | 10-20140013174 A | 2/2014 | |

OTHER PUBLICATIONS

International Search Report from PCT/KR2018/011007, dated Dec. 19, 2018.

* cited by examiner

*Primary Examiner* — Ling Siu Choi
*Assistant Examiner* — David L Miller
(74) *Attorney, Agent, or Firm* — Dentons US LLP

(57) ABSTRACT

A method of preparing an acrylonitrile-based copolymer for a carbon fiber. The method includes: preparing a reaction solution including a (meth)acrylonitrile-based monomer and a first reaction solvent; adding a first portion of a radical polymerization initiator to the reaction solution to initiate polymerization; and adding a second portion of the radical polymerization initiator to the reaction solution when a polymerization conversion ratio is between 70 to 80%.

11 Claims, No Drawings

METHOD OF PREPARING ACRYLONITRILE-BASED POLYMER FOR PRODUCING CARBON FIBER

CROSS-REFERENCE TO RELATED APPLICATIONS

This application is a national stage application of international Application No. PCT/KR2018/011007, filed Sep. 18, 2018, which claims priority to and the benefit of Korean Patent Application No. 10-2017-0127936, filed on Sep. 29, 2017, and Korean Patent Application No. 10-2018-0110670, filed on Sep. 17, 2018, the disclosures of which are incorporated herein by reference in their entirety.

TECHNICAL FIELD

The present invention relates to a method of preparing an acrylonitrile-based polymer for producing a carbon fiber, and more particularly, to a method of preparing an acrylonitrile-based polymer for producing a carbon fiber, including partially adding a radical polymerization initiator at specific points of time.

BACKGROUND ART

A carbon fiber is a fibrous carbon material that consists of 90 wt % or more of the carbon element with respect to the total weight, and refers to a fiber obtained by thermal decomposition of a fiber-type precursor prepared from an acrylonitrile-based polymer or a petroleum or charcoal-based hydrocarbon residue such as pitch or rayon in an inert atmosphere.

A carbon fiber is a fiber-type material which has a structure and tissue characteristic of carbon which is a component, has excellent characteristics such as thermal resistance, chemical stability, electrothermal conductivity, dimension stability due to low thermal expansion, a low density, a friction wear characteristic, X-ray permeability, electromagnetic wave shielding, biocompatibility and flexibility, and can impart a very excellent adsorption property according to activation conditions.

Meanwhile, an acrylonitrile-based polymer has been widely used as a raw material for a carbon fiber precursor. As a method of preparing an acrylonitrile-based polymer, solution polymerization is mainly used. The solution polymerization is a method using a monomer, an initiator and a reaction solvent, and can use a polymer solution itself as a spinning solution, and therefore this method has an advantage of unnecessity of a process of dissolving a polymer in a spinning solvent.

However, when an initiator is excessively added to increase a polymerization conversion ratio in solution polymerization, a weight average molecular weight is reduced and the viscosity of a polymer solution is so high that efficiency is degraded when it is used as a spinning solution of a polyacrylonitrile-based fiber. For this reason, research for increasing the productivity and weight average molecular weight of a polymer and suitably maintaining the viscosity of a polymer solution is continuing.

DISCLOSURE

Technical Problem

An object of the present invention is to provide a method of preparing an acrylonitrile-based polymer for producing a carbon fiber, wherein the acrylonitrile-based polymer for producing a carbon fiber has a low polydispersity index (PDI), a excellent viscosity in a polymer solution and an increased final polymerization conversion ratio.

Technical Solution

To attain the above-mentioned object, the present invention provides a method of preparing an acrylonitrile-based copolymer for a carbon fiber, which includes: preparing a reaction solution comprising a (meth)acrylonitrile-based monomer and a first reaction solvent; primarily adding an initiator to the reaction solution; and secondarily adding an initiator at the time point when a polymerization conversion ratio reaches 70 to 80% to perform polymerization.

Advantageous Effects

According to a method of preparing an acrylonitrile-based polymer for producing a carbon fiber of the present invention, an acrylonitrile-based polymer having a low polydispersity index and a high final polymerization conversion ratio can be prepared. Moreover, since the acrylonitrile-based polymer solution prepared by solution polymerization has a suitable viscosity, it can be used as a spinning solution for producing an acrylonitrile-based polymer fiber without separate post-processing.

MODES OF THE INVENTION

Hereinafter, the present invention will be described in further detail to help in understanding of the present invention.

Terms or words used in the specification and claims should not be interpreted as limited to ordinary or dictionary meanings, but interpreted as meanings and concepts corresponding to the technical idea of the present invention based on the principle in that the inventors can suitably define the concepts of these terms to explain the invention in the best way.

In the present invention, a polymerization conversion ratio is measured according to the following formula, by precipitating a certain amount of a polymer solution obtained previously in water, washing the precipitate with warm water, drying the resulting product at 70° C. for 4 hours, measuring a weight of the dry resin to measure a content of the solid.

Polymerization conversion ratio (%)=(Measured content of solid)/(content of solid per certain amount of reaction solution calculated by ratio of solid and solvent added to reactor)×100

The method of preparing an acrylonitrile-based polymer for producing a carbon fiber according to an exemplary embodiment of the present invention includes (1) preparing a reaction solution comprising a (meth)acrylonitrile-based monomer and a first reaction solvent, (2) primarily adding an initiator to the reaction solution to initiate polymerization, and (3) secondarily adding an initiator at the point of time when a polymer conversion ratio reaches 70 to 80% to perform polymerization.

Hereinafter, each step of the preparation method according to the present invention will be described in detail.

(1) Preparation of Reaction Solution

First, a reaction solution comprising a (meth)acrylonitrile-based monomer and a first reaction solvent is prepared.

The (meth)acrylonitrile-based monomer may be one or more selected from the group consisting of acrylonitrile and methacrylonitrile, and preferably acrylonitrile.

The first reaction solvent may be one or more selected from the group consisting of dimethyl sulfoxide, dimethylformamide and dimethylacetamide, and preferably dimethyl sulfoxide.

The reaction solution may include the first reaction solvent at 200 to 500 parts by weight, preferably 300 to 450 parts by weight, and more preferably 320 to 380 parts by weight with respect to 100 parts by weight of the (meth) acrylonitrile monomer.

When the above-described range is satisfied, since the reaction solution has a suitable viscosity, a polymerization conversion ratio in solution polymerization and a weight average molecular weight may be increased.

Meanwhile, the reaction solution may further include an additional monomer as a comonomer, in addition to the (meth)acrylonitrile monomer. The comonomer may be one or more selected from the group consisting of, for example, a carboxylic acid-based monomer and a (meth)acrylate-based monomer. The carboxylic acid-based monomer may be one or more selected from the group consisting of acrylic acid, methacrylic acid, ethacrylic acid, itaconic acid, crotonic acid, citraconic acid, maleic acid and mesaconic acid, and preferably itaconic acid. The (meth)acrylate-based monomer may be one or more selected from the group consisting of methyl acrylate, ethyl acrylate, propyl acrylate, methyl methacrylate, ethyl methacrylate and propyl methacrylate, and preferably methyl acrylate.

The comonomer may be included at 1 to 10 parts by weight, preferably, 1 to 7 parts by weight, and more preferably, 1 to 4 parts by weight with respect to 100 parts by weight of the (meth)acrylonitrile-based monomer. When the above-mentioned range is satisfied, it is possible to reduce an oxidation stabilization reaction initiation temperature in a process of producing an acrylonitrile-based polymer fiber, and impart suitable stretchability to the acrylonitrile-based polymer fiber.

(2) Primary Addition of Initiator

Subsequently, polymerization is initiated by primary addition of an initiator to the reaction solution.

The initiator serves to initiate a polymerization reaction between monomers in a reaction solution, and may be, for example, azobisisobutyronitrile, 2,2'-azobis(4-methoxy-2,4-dimethylvaleronitrile, 2,2'-azobis(2,4-dimethylvaleronitrile), dimethyl 2,2'-azobis(2-methylpropionate), 2,2'-azobis(2-methylbutyronitrile), 1,1'-azobis(cyclohexane-1-carbonitrile), 2,2'-azobis [n-(2 propenyl)-2-methylpropionamide], [(cyano-1-methylethyl)azo]formamide, 2,2'-azobis(n-butyl-2-methylpropionamide) or 2,2'-azobis(n-cyclohexyl-2-methylpropionamide), and preferably, one or more selected from the group consisting of azobisisobutyronitrile, dimethyl 2,2'-azobis(2-methylpropionate) and 2,2'-azobis(2-methylbutyronitrile).

The initiator may be primarily added after a temperature of the reaction solution is increased to 50 to 70° C. When the initiator is primarily added following the increase in temperature up to the above-mentioned temperature, a decrease in polymerization yield due to evaporation of the monomer in the reaction solution may be prevented, and the polymerization is effectively initiated by the initiator and performed at a high polymerization rate.

The primarily-added initiator may be added at 0.2 to 1 part by weight, preferably, 0.3 to 0.9 part by weight, and more preferably, 0.4 to 0.8 part by weight, with respect to 100 parts by weight of the (meth)acrylonitrile-based monomer.

When the above-mentioned range is satisfied, the final polymerization conversion ratio of the obtained polymer may be increased.

Polymerization may be performed for 2 to 10 hours, preferably, 4 to 8 hours, and more preferably, 5 to 7 hours after the initiator is primarily added.

When the above-mentioned range is satisfied, an acrylonitrile-based polymer having a low polydispersity index (Mw/Mn) may be prepared, and the final polymerization conversion ratio may also be increased. Specifically, an acrylonitrile-based polymer having a polydispersity index of 2.0 to 2.5 may be prepared. In addition, since the polydispersity index of the acrylonitrile-based polymer is lowered, a polyacrylonitrile-based fiber having less variation in physical properties may be prepared.

(3) Second Addition of Initiator

Next, when the polymerization has been performed after the primary addition of initiator and thus a polymerization conversion ratio reaches 70 to 80%, an initiator is secondarily added to perform a polymerization reaction.

Specifically, the second addition of the initiator may be performed at the point of time when a polymerization conversion ratio is preferably 73 to 80%, and more preferably 75 to 80%.

When the initiator is secondarily added at the mentioned point of time, an acrylonitrile-based polymer having a low polydispersity index (Mw/Mn) may be prepared, and the final polymerization conversion ratio may also be increased. Specifically, an acrylonitrile-based polymer having a polydispersity index of 2.0 to 2.5 may be prepared. In addition, as the polydispersity index of the acrylonitrile-based polymer is lowered, a polyacrylonitrile-based fiber having less variation in physical properties may be prepared.

When the initiator is secondarily added at the point of time when the polymerization conversion ratio is less than the above-mentioned range, the polydispersity index of the polymer is increased, and when the initiator is secondarily added at the point of time when the polymerization conversion ratio exceeds the above-mentioned range, the final polymerization conversion ratio is lowered.

Meanwhile, the secondarily-added initiator may be added while mixed with a second reaction solvent, wherein the second reaction solvent is preferably the same as the first reaction solvent. When the secondarily-added initiator is added while mixed with the second reaction solvent, the secondarily-added initiator may be more uniformly mixed with the first reaction solvent.

Here, the secondarily-added initiator and the second reaction solvent may be mixed in a weight ratio of 1:15 to 1:35, preferably, 1:20 to 1:30, and more preferably, 1:23 to 1:27.

When the secondarily-added initiator and the second reaction solvent are mixed in the above-mentioned range, a viscosity of the obtained polymer solution may be regulated, and thus it may be used as a spinning solution in production of a polyacrylonitrile-based fiber without separate post-treatment. Specifically, a polymer solution having a viscosity of 300 to 800 poise (at 45° C.), and preferably, 500 to 800 poise (at 45° C.), is prepared, and therefore, to be used as a spinning solution in the production of a polyacrylonitrile-based fiber, it is not necessary to separately regulate the viscosity.

In addition, the second reaction solvent may be added at 1 to 10 parts by weight, preferably, 1 to 5 parts by weight, and more preferably, 1 to 2 parts by weight, with respect to 100 parts by weight of the first reaction solvent.

When the above-mentioned range is satisfied, a viscosity of the obtained polymer solution may be regulated, and therefore the polymer solution may be used as a spinning solution in production of a polyacrylonitrile-based fiber without separate post-treatment. Specifically, a polymer solution having a viscosity of 300 to 800 poise (at 45° C.), and preferably, 500 to 800 poise (at 45° C.), is prepared, and therefore, to be used as a spinning solution in the production of a polyacrylonitrile-based fiber, it is not necessary to separately regulate the viscosity.

Meanwhile, a weight ratio of the primarily-added initiator and the secondarily-added initiator may be 1:1 to 10:1, preferably, 2:1 to 8:1, and more preferably, 2:1 to 6:1.

When the above-mentioned range is satisfied, an acrylonitrile-based polymer having a low polydispersity index (Mw/Mn) may be prepared, and the final polymerization conversion ratio may also be increased. Specifically, an acrylonitrile-based polymer having a polydispersity index of 2.0 to 2.5 may be prepared. In addition, as the polydispersity index of the acrylonitrile-based polymer is lowered, a polyacrylonitrile-based fiber having less variation in physical properties may be prepared.

The total content of the primarily-added initiator and the secondarily-added initiator may be 0.2 to 2 parts by weight, preferably, 0.5 to 1.5 parts by weight, and more preferably, 0.6 to 1.2 parts by weight, with respect to 100 parts by weight of the monomer mixture. When the above-mentioned range is satisfied, the polymerization conversion ratio of the obtained polymer is not degraded, and the solution polymerization may be easily performed.

EXAMPLES

Hereinafter, embodiments of the present invention will be described in detail so that those skilled in the art can easily carry out the present invention. However, the present invention may be embodied in a variety of different forms, and is not limited to examples to be described below.

Method of Preparing Acrylonitrile-Based Polymer

Example 1

A reaction solution was prepared by uniformly dissolving 100 parts by weight of a monomer mixture in which acrylonitrile, methyl acrylate and itaconic acid were mixed at a molar ratio of 97:2:1 in 365 parts by weight of dimethyl sulfoxide. A radical polymerization initiator solution was prepared by uniformly dissolving 0.2 part by weight of azobisisobutyronitrile as a radical polymerization initiator in 5 parts by weight of dimethyl sulfoxide.

The reaction solution was added to a reactor equipped with a stirrer, subjected to nitrogen substitution, followed by raising a temperature in the reactor to 70° C. 0.4 part by weight of azobisisobutyronitrile was added as a radical polymerization initiator to perform solution polymerization for 5 hours, the total amount of the radical polymerization initiator solution was batchwise-added (at the point of time when a polymerization conversion ratio reached 70%) to perform a polymerization reaction for 8 hours, and then the reaction was stopped, thereby obtaining an acrylonitrile-based polymer solution.

Example 2

An acrylonitrile-based polymer solution was obtained by the same method as described in Example 1, except that the total amount of the radical polymerization initiator solution was batchwise-added (at the point of time when a polymerization conversion ratio reached 75%) after the solution polymerization was performed for 6 hours.

Example 3

An acrylonitrile-based polymer solution was obtained by the same method as described in Example 1, except that the total amount of the radical polymerization initiator solution was batchwise-added (at the point of time when a polymerization conversion ratio reached 80%) after the solution polymerization was performed for 7 hours.

Example 4

An acrylonitrile-based polymer solution was obtained by the same method as described in Example 1, except that a radical polymerization initiator solution in which dimethyl 2,2'-azobis(2-methylpropionate), instead of azobisisobutyronitrile, was uniformly dissolved was added.

Example 5

An acrylonitrile-based polymer solution was obtained by the same method as described in Example 3, except that a radical polymerization initiator solution in which dimethyl 2,2'-azobis(2-methylpropionate), instead of azobisisobutyronitrile, was uniformly dissolved, was added.

Comparative Example 1

An acrylonitrile-based polymer solution was obtained by the same method as described in Example 1, except that the total amount of a radical polymerization initiator solution was batchwise-added (at the point of time when a polymerization conversion ratio reached 69%) after the solution polymerization was performed for 4.9 hours.

Comparative Example 2

An acrylonitrile-based polymer solution was obtained by the same method as described in Example 1, except that the total amount of a radical polymerization initiator solution was batchwise-added (at the point of time when a polymerization conversion ratio reached 81%) after the solution polymerization was performed for 7.2 hours.

Comparative Example 3

A reaction solution was prepared by uniformly dissolving 100 parts by weight of a monomer mixture in which acrylonitrile, methyl acrylate and itaconic acid were mixed at a molar ratio of 97:2:1 in 370 parts by weight of dimethyl sulfoxide.

The reaction solution was added to a reactor equipped with a stirrer, subjected to nitrogen substitution, followed by raising a temperature in the reactor to 70° C. 0.6 part by weight of azobisisobutyronitrile was added as a radical polymerization initiator to perform solution polymerization for 14 hours, and the reaction was stopped, thereby obtaining an acrylonitrile-based polymer solution.

Comparative Example 4

A reaction solution was prepared by uniformly dissolving 100 parts by weight of a monomer mixture in which acrylonitrile, methyl acrylate and itaconic acid were mixed at a molar ratio of 97:2:1 in 365 parts by weight of dimethyl sulfoxide.

The reaction solution was added to a reactor equipped with a stirrer, subjected to nitrogen substitution, followed by raising a temperature in the reactor to 70° C. 0.6 part by weight of azobisisobutyronitrile was added as a radical polymerization initiator to perform solution polymerization for 6 hours. Subsequently, 5 parts by weight of dimethyl sulfoxide was batchwise-added to further perform a polymerization reaction for 8 hours, and then the reaction was stopped, thereby obtaining an acrylonitrile-based polymer solution.

Comparative Example 5

A reaction solution was prepared by uniformly dissolving 100 parts by weight of a monomer mixture in which acrylonitrile, methyl acrylate and itaconic acid were mixed at a molar ratio of 97:2:1 in 370 parts by weight of dimethyl sulfoxide.

The reaction solution was added to a reactor equipped with a stirrer, subjected to nitrogen substitution, followed by raising a temperature in the reactor to 70° C. 0.4 part by weight of azobisisobutyronitrile was added as a radical polymerization initiator to perform polymerization for 14 hours, and the reaction was stopped, thereby obtaining an acrylonitrile-based polymer solution.

Experimental Example 1

A polymerization conversion ratio and a polydispersity index (PDI:Mw/Mn) of each of the acrylonitrile-based polymers of Example 1 and Comparative Examples 1 to 3 were measured, and a viscosity of the polymer solution was measured. The results are listed in Table 1 below.

1) Final polymerization conversion ratio: 1 g of the obtained polymer solution was precipitated in water, washed with warm water, and dried at 70° C. for 4 hours. A weight of the dry resin was measured to measure a content of the solid, and the polymerization conversion ratio was measured by the following formula.

Polymerization conversion ratio (%)=(Measured content of solid)/(content of solid per gram of reaction solution calculated by ratio of solid and solvent added to reactor)×100

2) Polydispersity index (PDI): A weight average molecular weight (Mw) and a number average molecular weight (Mn) of 1 g of the obtained polymer solution were measured by gel permeation chromatography (GPC) under the following conditions, and a polydispersity index was calculated.

Column: PL mixed B×2, Solvent: DMF/0.05 M LiBr (0.45 μm filtered), Flow rate: 1.0 ml/min, Sample concentration: 4.0 mg/ml, Injection amount: 100 μl, Column temperature: 65° C., Detector: Waters RI Detector, Standard: PMMA 3) Viscosity: The viscosity was measured using a Brookfield viscometer under the following conditions.

Spindle type-cone type (CPA-52Z), cone angle=3°, cone radius=1.2 cm, Gap: 13 μm or less, Measured shear rate: 10 to 20/sec, Measured temperature: −45° C.

TABLE 1

| Classification | Final polymerization conversion ratio (%) | Polydispersity index | Solid content in Polymer solution (wt %) | Viscosity (poise) |
|---|---|---|---|---|
| Example 1 | 93 | 2.3 | 21.4 | 591 |
| Example 2 | 93 | 2.3 | 21.4 | 589 |
| Example 3 | 92 | 2.3 | 21.2 | 570 |
| Example 4 | 92 | 2.3 | 21.4 | 568 |
| Example 5 | 92 | 2.3 | 21.2 | 573 |
| Comparative Example 1 | 93 | 2.5 | 21.4 | 450 |
| Comparative Example 2 | 88 | 2.3 | 20.2 | 456 |
| Comparative Example 3 | 93 | 2.6 | 21.4 | 216 |
| Comparative Example 4 | 93 | 2.6 | 21.4 | 287 |
| Comparative Example 5 | 86 | 2.2 | 21.4 | 298 |

Referring to Table 1, it was confirmed that Examples 1 to 5 showed that the acrylonitrile-based polymers having a low polydispersity index and uniform distribution were prepared. In addition, it can be confirmed that the polymer solutions of Examples 1 to 5 have a high viscosity, and thus can be used as a spinning solution for producing a fiber without separate post-treatment. On the other hand, the polymer of Comparative Example 1 had a high polydispersity index, and the polymer solution had a significantly low viscosity, and thus was not suitable to be used as a spinning solution for producing a fiber without separate post-treatment.

The polymer of Comparative Example 2 had a significantly low final polymerization conversion ratio, and the polymer solution of Comparative Example 2 had a low solid content and a significantly low viscosity such that it was not suitable to be used as a spinning solution for producing a fiber without separate post-treatment.

In Comparative Examples 3 and 4, polymers having a high polydispersity index were prepared, and the polymer solutions had a significantly low viscosity such that they were not suitable to be used as a spinning solution for producing a fiber.

In addition, in Comparative Example 5, the polymer had the low final polymerization conversion ratio, and the polymer solution had a low viscosity such that it was not suitable to be used as a spinning solution for producing a fiber.

The invention claimed is:

1. A method of preparing a copolymer for a carbon fiber, comprising:
preparing a reaction solution comprising a (meth)acrylonitrile-containing monomer chosen from the group consisting of acrylonitrile and methacrylonitrile and a first reaction solvent;
primarily adding an initiator to the reaction solution to initiate polymerization; and
secondarily adding an initiator when a polymerization conversion rate reaches between 70 to 80% to perform polymerization,
wherein the initiator added in the primary and secondary stages has the same composition, and is selected from one or more of: azobisisobutyronitrile, 2,2'-azobis(4-methoxy-2,4-dimethylvaleronitrile, 2,2'-azobis(2,4-dimethylvaleronitrile), dimethyl 2,2'-azobis(2-methylpropionate), 2,2'-azobis (2-methylbutyronitrile), 1,1'-azobis(cyclohexane-1-carbonitrile), 2,2'-azobis [N-(2-propenyl)-2-methylpropionamide], [(cyano-1- methylethyl)azo]formamide, 2,2'-azobis(N-butyl-2-methylpropionamide) and 2,2'-azobis(N-cyclohexyl-2 methylpropionamide), and wherein a weight ratio of the primarily-added initiator and the secondarily-added initiator is 2:1 to 8:1.

2. The method of claim 1, wherein the secondarily-added initiator is added while mixed with a second reaction solvent.

3. The method of claim 2, wherein the second reaction solvent is the same as the first reaction solvent.

4. The method of claim 2, wherein the secondarily-added initiator and the second reaction solvent are mixed in a weight ratio of 1:15 to 1:35.

5. The method of claim 2, wherein the second reaction solvent is added in an amount of 1 to 10 parts by weight with respect to 100 parts by weight of the first reaction solvent.

6. The method of claim 1, wherein the total content of the primarily-added initiator and the secondarily-added initiator is 0.2 to 2 parts by weight with respect to 100 parts by weight of the (meth)acrylonitrile-containing monomer.

7. The method of claim 1, further comprising:
raising a temperature of the reaction solution to 50 to 70° C. before the first addition of the initiator.

8. The method of claim 1, wherein the reaction solution further comprises one or more comonomers selected from the group consisting of a carboxylic acid-containing monomer and a (meth)acrylate-containing monomer.

9. The method of claim 8, wherein the one or more comonomer(s) is/are included in an amount of 1 to 10 parts by weight with respect to 100 parts by weight of the (meth)acrylonitrile-containing monomer.

10. The method of claim 1, wherein the initiator added in the primary and secondary stages has the same composition, and is selected from one or more of: azobisisobutyronitrile, dimethyl 2,2'-azobis(2-methylpropionate) and 2,2'-azobis(2-methylbutyronitrile).

11. The method of claim 1, wherein preparing the reaction solution comprises preparing the reaction solution within a reactor, and wherein both the primary and secondary additions of the initiator are made to the same reactor.

* * * * *